United States Patent

[11] 3,594,796

| [72] | Inventor | Charles W. Earp<br>London, England |
|---|---|---|
| [21] | Appl. No. | 823,904 |
| [22] | Filed | May 12, 1969 |
| [45] | Patented | July 20, 1971 |
| [73] | Assignee | International Standard Electric Corporation<br>New York, N.Y. |
| [32] | Priority | July 18, 1968 |
| [33] | | Great Britain |
| [31] | | 34,323/68 |

[54] DISTANCE MEASURING
7 Claims, 5 Drawing Figs.

[52] U.S. Cl. .................................................. 343/112 R,
343/102
[51] Int. Cl. ................................................. G01s 5/14,
G01s 11/00
[50] Field of Search .......................................... 343/112,
102, 105

[56] References Cited
UNITED STATES PATENTS

| 3,366,975 | 1/1968 | Lode | 343/112 (.3) |
| 3,337,872 | 8/1967 | Earp | 343/112 (.3) |

*Primary Examiner*—Rodney D. Bennett, Jr.
*Assistant Examiner*—Richard E. Berger
*Attorneys*—C. Cornell, M. Remsen, Jr., Walter J. Baum, Paul W. Hemminger, Percy P. Lantzy, Philip M. Bolton, Isidore Togut and Charles L. Johnson, Jr.

ABSTRACT: A pair of horizontally radiating vertically spaced antennas, A and B, radiate frequencies $f$ and $f+\delta f$, respectively, from a first vehicle. On a second vehicle there is provided a receiver which is coupled to a pair of similarly mounted antennas, $A^1$ and $B^1$. Each antenna, $A^1$ and $B^1$, receives $f$ and $f+\delta f$. Said receiver determines the phase difference between the best frequencies corresponding to $f$ and $f+\delta f$ at each antenna, $A^1$ and $B^1$, and determines therefrom the distance from said second vehicle to said first vehicle.

Inventor
CHARLES W. EARP
By Philip M. Bolton
Attorney

DISTANCE MEASURING

BACKGROUND OF THE INVENTION

This invention relates to distance measuring equipment for vehicles and is particularly applicable to aircraft, where the distance between aircraft is probably the most important item of information for a collision avoidance system.

One known system for providing the all important distance information makes use of complex equipment which requires, inter alia, atomic clocks on each aircraft.

SUMMARY OF THE INVENTION

It is an object of the invention to provide distance measuring equipment which does not require an accurate clock or time base.

It is another object of the present invention to provide a collision avoidance system, wherein an aircraft which is provided with a receiver, according to the invention, will receive warning of possible collision with other aircrafts which are equipped with transmitters only.

According to the present invention there is provided a receiver for measuring the distance from said receiver to a pair of closely spaced transmitters which respectively radiate frequencies $f$ and $f+\delta f$ and which comprises, a pair of spaced antennas and means for determining the phase difference between beat frequency signals, corresponding to said radiated frequencies, present at each of said antennas.

BRIEF DESCRIPTION OF THE DRAWINGS

The above-mentioned and other features of the invention and the manner of attaining them will become more apparent and the invention itself will be best understood by reference to the following description of embodiments of the invention taken in conjunction with the accompanying drawings in which.

DESCRIPTION OF THE PREFERRED EMBODIMENT

Figure 1:
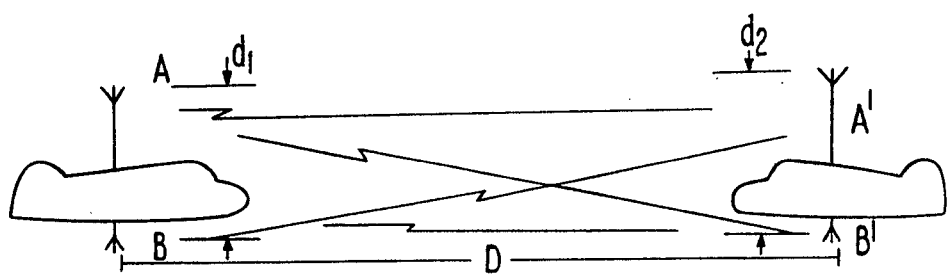
FIG. 1 illustrates graphically the principle upon which the invention is based.

FIG. 1 shows an arrangement with a pair of transmitter aerials A, B spaced apart on one vehicle and a pair of receiver aerials $A^1$, $B^1$ similarly positioned on another vehicle at a distance D from the first vehicle. A and B are spaced apart by the distance $d_1$ and $A^1$ and $B^1$ are spaced apart by the distance $d_2$. Aerial A radiates a frequency $f$ and B radiates a frequency $f+\delta f$. $A^1$ and $B^1$ each receive both frequencies and a beat-note frequency can be derived as a result. At $A^1$ frequency $f$ is received over a shorter path than $f+\delta f$ and at $B^1$ the conditions are reversed. Thus, assuming the frequencies are suitable in relation to D, $d_1$ and $d_2$, there will be a phase difference between the beat-note frequencies at $A^1$ and $B^1$. Since $d_1$ and $d_2$ remain constant, any alteration of D will result in a change of the beat-note phase difference.

The phase difference $\Phi$ of the beat-notes at $A^1$ and $B^1$ is given by:

$$\Phi = 2\frac{2\pi}{\lambda}(\sqrt{D^2 + d^2} - D)$$

(where $\lambda$ is wavelength)

$$= \frac{4\pi D}{\lambda}\left(\left(1+\frac{d^2}{D^2}\right)^{1/2} - 1\right)$$

$$= \frac{4\pi D}{\lambda}\left(1 + \frac{1}{2}\frac{d^2}{D^2} - 1\right)$$

$$= \frac{2\pi d^2}{\lambda D} \text{ radians}$$

Therefore $$\Phi = \frac{2\pi d_1 d_2}{\lambda D}$$

And, conversely, $$D = \frac{2\pi d_1 d_2}{\lambda \Phi}$$

If $D$=10 miles
$d_1$=10 feet
$d_2$=10 feet
$f$=12 Ghz., hence $\lambda$=1 inch

Then $\Phi$=1/7 radian or approximately 8°.

Hence, for a measurement accuracy of 1°, distance accuracy at 20 miles range is 25 percent improving to 2.5 percent at 2 miles.

It should be noted that ambiguity of $D$ arises if $\Phi$ exceeds 360° but with the practical constants chosen above this can only happen when $D$ is less than 1200 feet.

Figure 2:
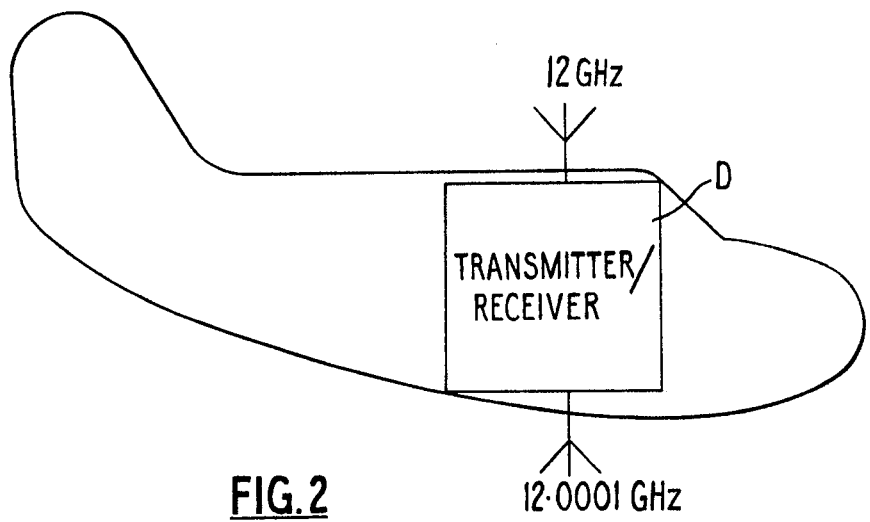
FIG. 2 illustrates diagrammatically the application of the invention to aircraft.

In the case of aircraft, a vertical separation of 10 feet between aerials is quite a practical proposition, as illustrated in FIG. 2. One aerial A is placed on top of the aircraft and the other aerial B is placed beneath it. The aerials are coupled to transmitter and receiver D which operate in synchronism with one another, transmitting 0.01-second bursts at 1-second intervals.

Figure 3:
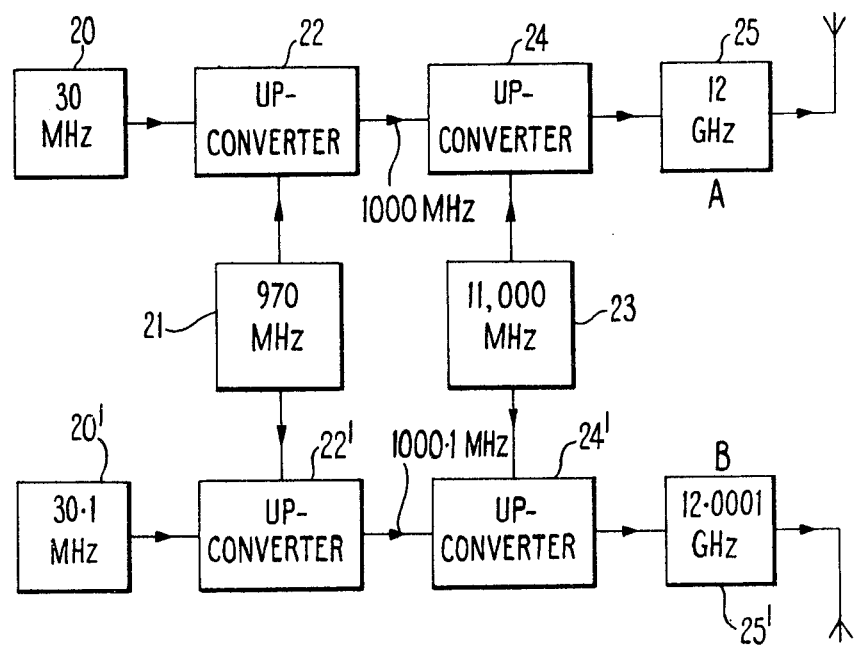
FIG. 3 is a block diagram illustrating the nature of the two transmitters utilized in the embodiment illustrated in FIG. 2.

The transmitter is built up as shown in FIG. 3. Two crystal controlled oscillators 20, $20^1$ generate frequencies of 30 MHz. and 30.1 MHz. respectively. A third oscillator 21 is used to generate 970 MHz. and this is applied to two varactor up-converters 22, $22^1$. Up-converter 22 takes the 970 MHz. and 30 MHz. signals and has an output of 1000 MHz., while up-converter $22^1$ takes the 970 MHz. and 30.1 MHz. signals and produces and output at 1000.1 MHz. The up-converters are essentially variable capacitance mixers each providing an amplified upper sideband output.

A fourth oscillator 23 generating 11,000 MHz. is used together with two more varactor up-converters 24, $24^1$ to provide final frequencies of 12 GHz. and 12.0001 GHz. respectively to the output stages 25, $25^1$.

The transmitter is operated for 0.01 seconds at 1-second intervals, thus enabling the receiver to receiver to receive signals from other aircraft for 99 percent of the time.

Figure 4:
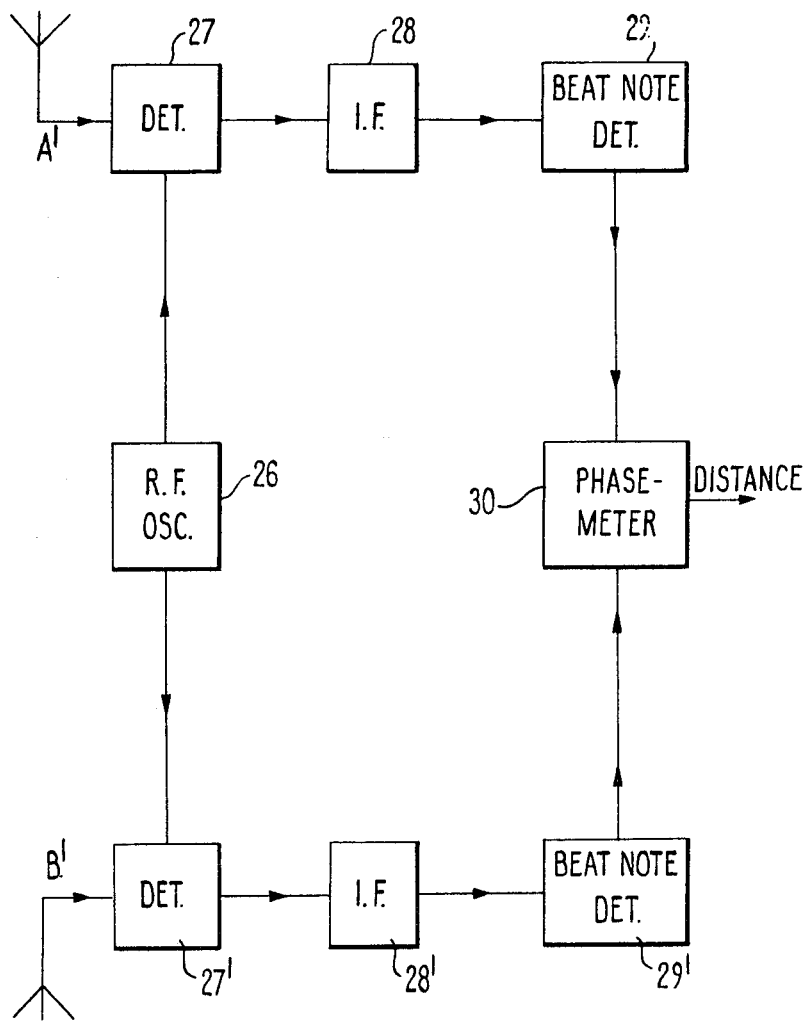
FIG. 4 is a receiver according to the invention.

FIG. 4 shows the basic structure of the receiving equipments carried in each aircraft. The aerials $A^1$, $B^1$ can be the same aerials A, B used by the transmitters in FIG. 3. The signals received are mixed with the output of local oscillator 26 in the detector stages 27, $27^1$, the outputs of which are applied via the intermediate frequency stages 28, $28^1$ to beat-note detectors 29, $29^1$. The detectors 29, $29^1$ each produce a beat-note of 100 kHz., the phase of one beat-note relative to the other depending on the distance between the transmitters and receivers. The two beat-notes are fed to a phase meter 30, the output of which can be converted into distance.

The phase meter can take the form of a sum-and-difference detector given a DC output proportional to the size of the angle of phase difference.

Figure 5:
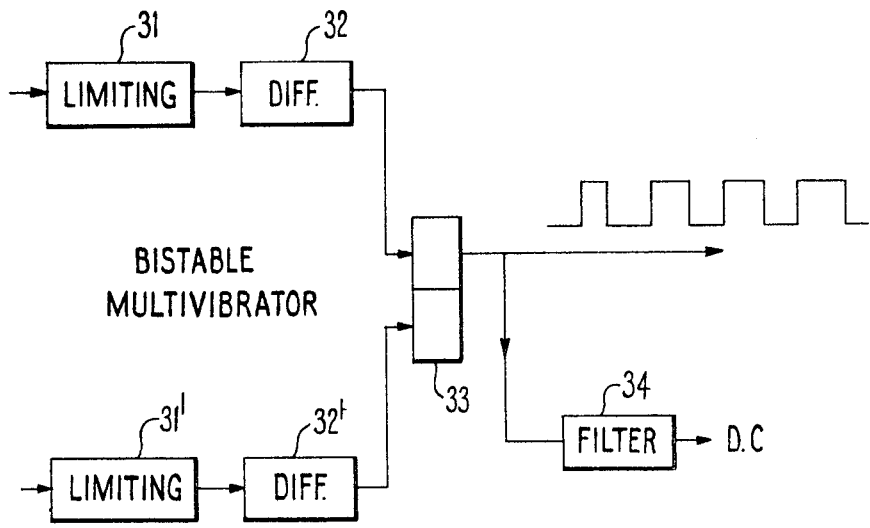
FIG. 5 is a block diagram illustrating an arrangement for determining the phase relationship of two beat-note frequencies.

An alternative arrangement for the phase meter is shown in FIG. 5, in which the two 100 kHz. beat-notes are each "squared" by a limiting circuit 31, $31^1$, the squared signals then being passed through differentiating circuits 32, $32^1$. The outputs of the differentiators are trains of short pulses at 100 kHz. having the same phase difference as the beat-notes. The differentiated signals are used to drive a bistable multivibrator 33. The bistable multivibrator is set to a $1^1$ condition by the pulses from 32 and is reset to "0" by the pulses from $32^1$. The result is a square wave output having a variable on-off ratio from zero to unity corresponding to a phase difference angle of from 0° to 360°. This output is particularly suitable for processing by computer. Otherwise the variable on-off square wave may be passed through a filter to obtain a DC component the value of which is directly proportional to the phase difference.

Assuming that the frequency F is accurate to one part in $10^8$, then each receiver may be used to measure the Doppler displacement frequency to yield closing velocities with an accuracy of 10 ft./sec.

Thus, each aircraft is able to measure proximity $r$, and closing velocity $\dot{r}$ to any aircraft of similar altitude, and to provide the well-known Tau $= r/\dot{r}$ alert approximate time to nearest approach.

If the duration of radiated signals is of the order of 0.01 second, then $\dot{r}$ could be measured with sufficient accuracy by simple digital methods, or the duration could be reduced to the order of 1 microsecond, when $f$ would be of the order of 5 MHz.

The difference frequency $\delta f$ radiated by each aircraft would be coded to indicate barometric height, so that receivers could be arranged to respond only to signals from aircraft of a similar height.

The system can be applied to a ground beacon, when radiation would be continuous. In this case, one radiator would be placed at ground level, and the other above a flat elevated counterpoise.

Such a system could provide the additional facility of glide-path information, by the addition of a reference signal at frequency $\delta f$. Such a reference could be transmitted as a frequency modulation of a subcarrier wave which amplitude modulates the radiation at frequency $f$. In the receiver a preselected glide slope would be defined by a constant phase relationship between the reference wave at $\delta f$ and the beat $\delta f$ between the radiations of $f$ and $f+\delta f$. Addition of such a reference wave to an airborne beacon would permit measurement of relative angles of elevation between craft.

I claim:

1. A receiver for measuring the distance to a pair of spaced transmitters which respectively radiate frequencies $f$ and $f+\delta f$ comprising:

a pair of spaced antennas;

means coupled to each antenna for deriving the beat frequencies between $f$ and $f+\delta f$ at each antenna; and means for determining the phase difference between said beat frequency signals.

2. A receiver, according to claim 1, wherein said pair of spaced antennas are vertically arranged.

3. A receiver, according to claim 1, wherein said means for deriving the beat frequency between $f$ and $f+\delta f$ at each antenna includes a first and second detector each of which is coupled to one of said antennas;

an RF oscillator coupled to said first and second detectors, and first and second means for extracting beat frequency signals respectively coupled to said first and second detectors.

4. A receiver, according to claim 1, wherein said means for determining the phase difference between said beat frequency signals includes a first and second limiter;

first and second differentiators coupled to said first and second limiters respectively;

a bistable multivibrator coupled to said first and second differentiators; and a DC filter coupled to said bistable multivibrator whose output is a measure of the phase difference between said beat frequency signals.

5. A receiver, according to claim 1, further including a transmitter coupled to said pair of spaced antennas for radiating respectively first and second frequencies.

6. A receiver, according to claim 5, wherein said first and second frequencies are a function of the altitude of the receiver.

7. A receiver, according to claim 5, wherein said first and second frequencies are radiated only when frequencies $f$ and $f+\delta f$ are not being received.